United States Patent [19]

Thoma et al.

[11] Patent Number: 5,228,366
[45] Date of Patent: Jul. 20, 1993

[54] VARIABLE SPEED TRANSAXLE

[75] Inventors: Christian H. Thoma, St. Clement; George D. M. Arnold; Arthur A. Blair, both of St. Helier, all of Great Britain

[73] Assignee: Unipat AG, Glarus, Switzerland

[21] Appl. No.: 798,147

[22] Filed: Nov. 26, 1991

[30] Foreign Application Priority Data

Nov. 26, 1990 [GB] United Kingdom ............... 9025676

[51] Int. Cl.⁵ ............................................. F16H 57/02
[52] U.S. Cl. .................................... 74/606 R; 475/72; 180/300
[58] Field of Search ............... 475/72; 74/606 R, 745, 74/607; 180/300

[56] References Cited

U.S. PATENT DOCUMENTS

| | | | |
|---|---|---|---|
| 2,583,704 | 1/1952 | Nicholls et al. | 74/606 R |
| 4,635,535 | 1/1987 | Thoma et al. | 91/498 |
| 4,756,208 | 7/1988 | Hayashi et al. | 74/606 R |
| 4,852,426 | 8/1989 | De Rees | 74/607 |
| 4,867,008 | 9/1989 | Yamaoka et al. | 180/300 X |
| 4,974,472 | 12/1990 | Nishimura et al. | 74/718 |
| 4,979,583 | 12/1990 | Thoma et al. | 74/606 R X |
| 4,987,796 | 1/1991 | von Kaler et al. | 74/606 R |
| 5,007,307 | 4/1991 | Tamazawa et al. | 74/606 R |
| 5,042,252 | 8/1991 | Havens et al. | 60/487 |
| 5,058,459 | 10/1991 | Nemoto et al. | 74/745 |
| 5,146,748 | 9/1992 | Okada | 74/606 R X |

FOREIGN PATENT DOCUMENTS

| | | |
|---|---|---|
| 0116763 | 8/1984 | European Pat. Off. |
| 2241928 | 9/1991 | United Kingdom. |
| 2243352 | 10/1991 | United Kingdom. |

*Primary Examiner*—Vinh T. Luong
*Attorney, Agent, or Firm*—Young & Thompson

[57] ABSTRACT

A transaxle driving apparatus for a self-propelled vehicle such as a grass-mowing lawn tractor, the transaxle comprising a two-piece housing structure forming an internal chamber for encapsulation of a hydrostatic machine and associated reduction gearing. The hydrostatic machine may comprise in one form a single hydrostatic pump driven by an input shaft rotatably supported in the housing, and fluidly coupled to two hydrostatic motors. In a modified form, the hydrostatic machine may comprise two hydrostatic motors fluidly coupled to a pumping source remotely mounted outside the transaxle.

16 Claims, 6 Drawing Sheets

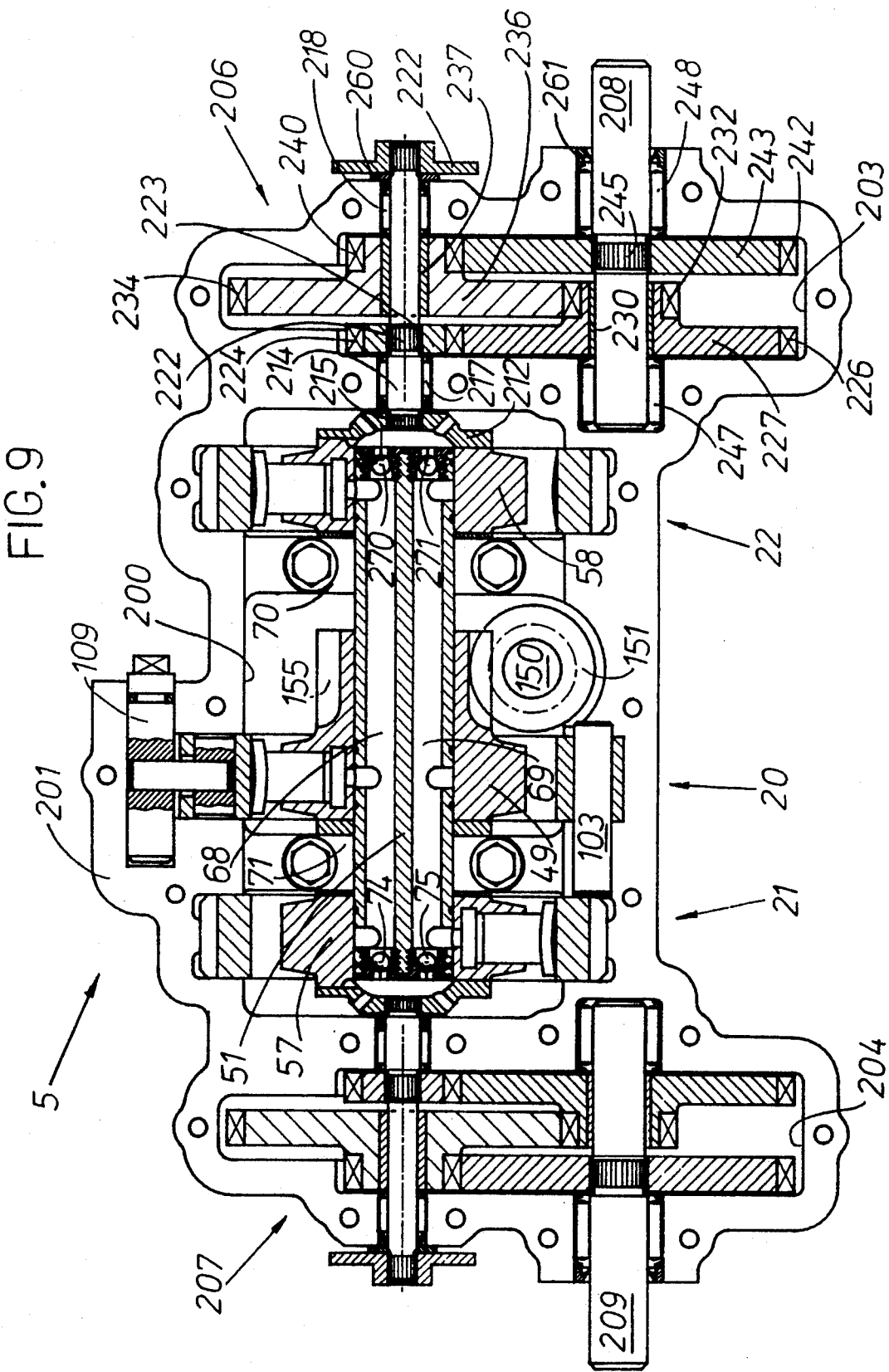

VARIABLE SPEED TRANSAXLE

The field of the invention relates to hydrostatic machines in association with transaxle driving apparatus used typically for example, in grass-mowing vehicles such as ride-on tractors and walk-behind mowers, and where in particular it becomes advantageous to manufacture the hydrostatic machine and transaxle as one unitary item.

The present invention teaches several improvements over a hydrostatic variable speed transaxle shown in U.S. Pat. No. 4,979,583 where a shaft driven hydraulic pump is fluidly coupled to a hydraulic motor for power transmission. The hydraulic motor is connected via reduction gearing including bevel gears, through a mechanical differential to the axle drive shafts of the transaxle. Further, the present invention teaches improvements over U.S. Pat. No. 2,583,704 where the cylinder barrel of the hydraulic pump is mechanically coupled to cylinder barrels of two hydraulic motors, reaction members of each hydraulic motor being connected through a drive shaft to respective drive wheels of a vehicle.

In the present invention a hydraulic pump is fluidly coupled to two hydraulic motors which operate at high rotational speed and are coupled through reduction gearing to the drive wheels of the vehicle.

According to one embodiment of the invention, the hydraulic motors forming part of the hydrostatic fluid circuit are mounted for rotation on an axis that is coaxial with the rotating axis of the drive wheels of the vehicle, and where each hydraulic motor is located as near as possible to its respective axle shaft by means of well known art such as epicyclic gearing, or preferably, a speed reducer of the type described in patent application PCT/GB91/01194.

According to a modified form of the invention, the transaxle contains two hydraulic motors, and where the source of input power is provided hydraulically from a remotely mounted hydraulic pumping source. Fluid entry and exit ducts are provided on the exterior housing surface of the transaxle allowing the hydraulic output of the pumping source to be received and distributed to the internally located hydraulic motors. The transaxle has merit for example, in four-wheel drive tractor vehicles when it is an advantage to drive all the wheels from a remote source of hydraulic power.

A further embodiment of the invention discloses the use of conventional spur gear reduction trains disposed between each hydraulic motor and its respective axle shaft.

A further feature of the invention provides the possibility of skid-steering of such vehicles by introducing a flow restriction in the internal fluid galleries linking the two hydraulic motors in order that fluid energy can be intentionally biased in favour of one hydraulic motor.

A still further feature of the invention allows provision to is extend the input drive shaft through the housing in order that for certain applications, ancillary equipment such as a grass or leaf collector can be powered from the same prime mover as is used to drive the hydraulic pump.

These and other objects of the invention will become more apparent in the detailed description and examples that follows.

BRIEF DESCRIPTION OF THE DRAWINGS

The above mentioned and other features and objects of the invention, and the manner of attaining them, may be performed in various ways and will now be described by way of examples with reference to the accompanying drawings, in which:

FIG. 9 shows the fourth embodiment of the invention and is a plan view of the transaxle, where one housing element is removed to show the internal components.

DETAILED DESCRIPTION OF THE FIRST EMBODIMENT

Manufacturers of self-propelled lawn mowing machinery have an increasing tendency to install vertical crank-shaft internal combustion engines to such vehicles. For lawn tractors, this enables them to install simple belt drives to transmit power from the engine to both the mower deck and transaxle.

Figure 1:
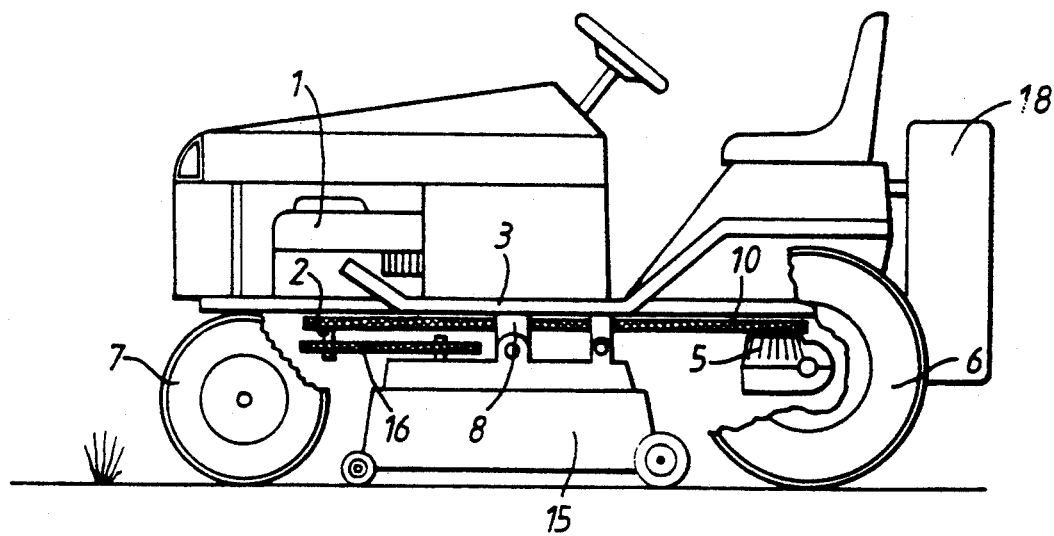
FIG. 1 is a side view of a typical grass cutting lawn or garden tractor vehicle.
Figure 2:
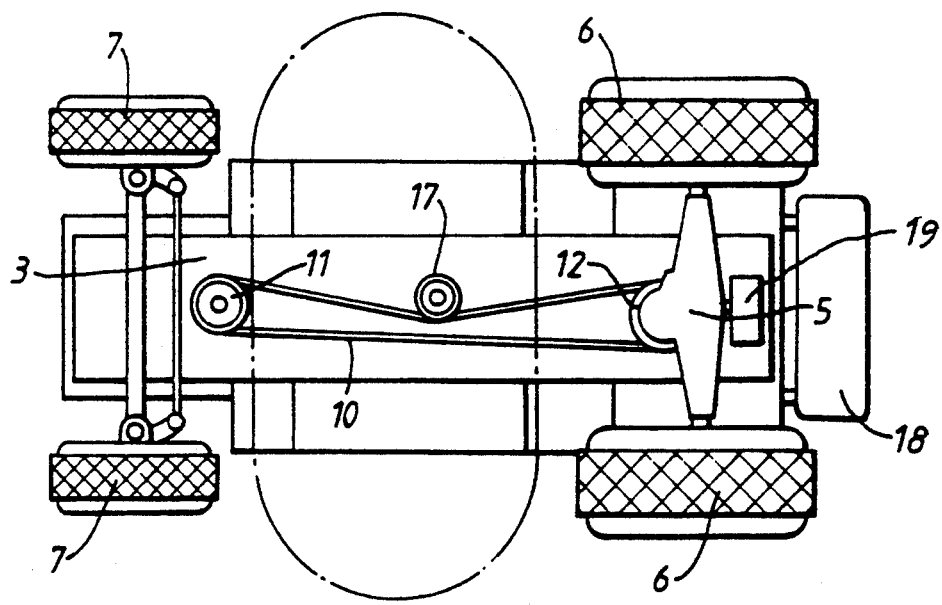
FIG. 2 is an underneath view of the vehicle in FIG. 1.

Although this invention can also be used for walk-behind pedestrian mowing machinery, a typical application for the invention is a lawn tractor. The tractor vehicle as illustrated in FIGS. 1 and 2 comprises a vertically installed internal combustion engine 1 with the crank-shaft 2 pointing down to the ground. The engine 1 is shown mounted at the front end of the tractor chassis 3, and the transaxle 5 containing an internally disposed hydrostatic machine, is mounted towards the rear of the tractor chassis 3 and engaged to the rear drive wheels 6. A Vee belt 10 operating in the horizontal plane connects the engine pulley 11 with the input drive pulley 12 of the transaxle 5, with a simple jockey pulley 17 acting as tensioning means for the Vee belt as shown in FIG. 2. On occasion, a clutch pedal connected via linkages to the jockey pulley 17 is required to release the tension of the Vee belt before the engine is started.

In FIG. 1, a grass mower deck 15 is shown located beneath the vehicle chassis 3 in a position between the rear two drive wheels 6 and the front two steering wheels 7 of the tractor. The mower deck 15 is attached to the tractor chassis 3 by way of height-adjusting supports 8 and is driven from the engine 1 by means of a short Vee belt 16. Grass cuttings are drawn or sucked from under the mower deck 15 into a collector bag 18 attached to the rear of the tractor, and this can be achieved by means of providing a power-take-off shaft from the transaxle 5 which drives an ancillary device such as an auxiliary blower unit 19.

Figure 3:
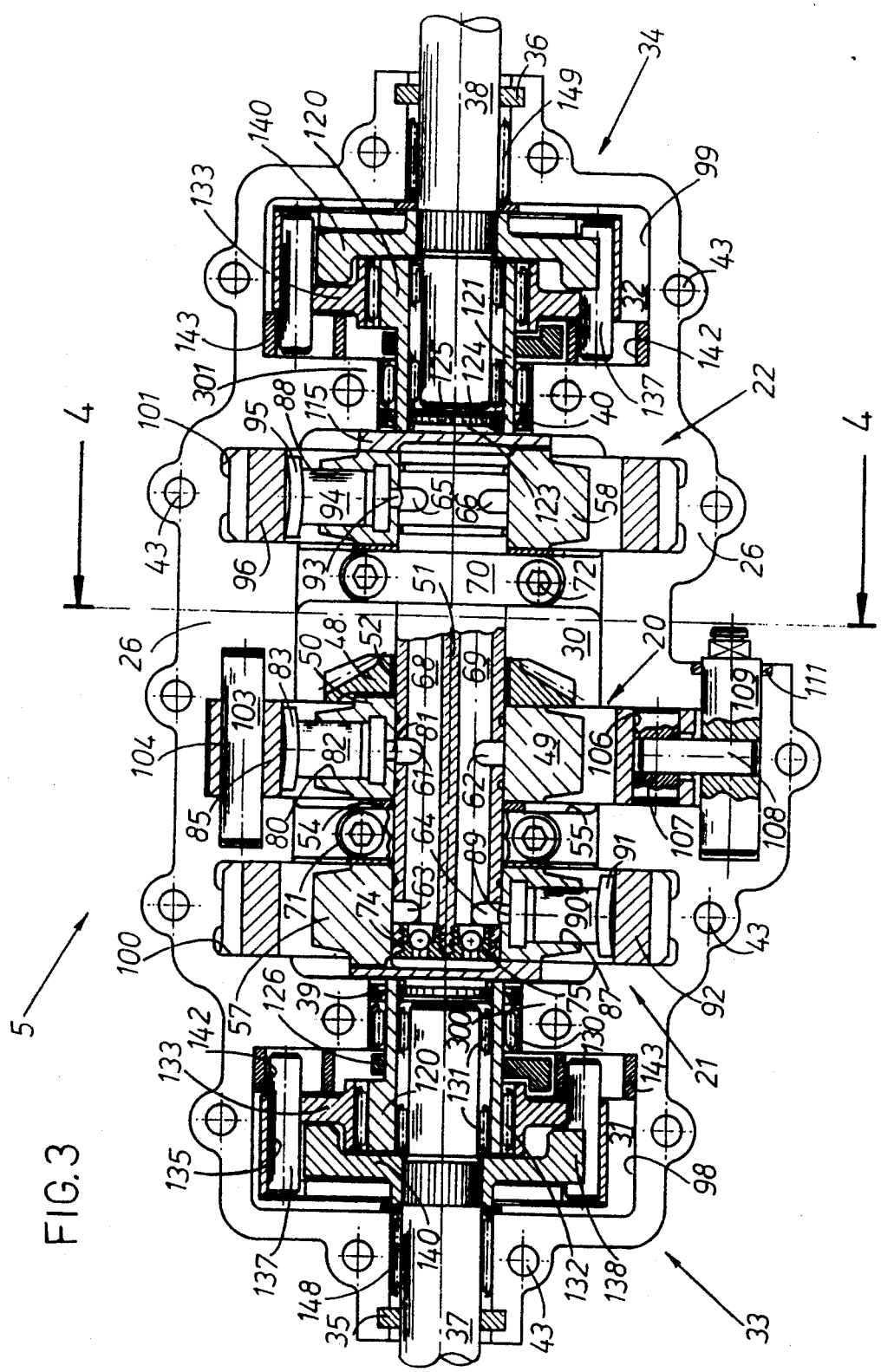
FIG. 3 is a plan view of the first embodiment of the invention, where one housing element is removed to show the internal components.
Figure 4:
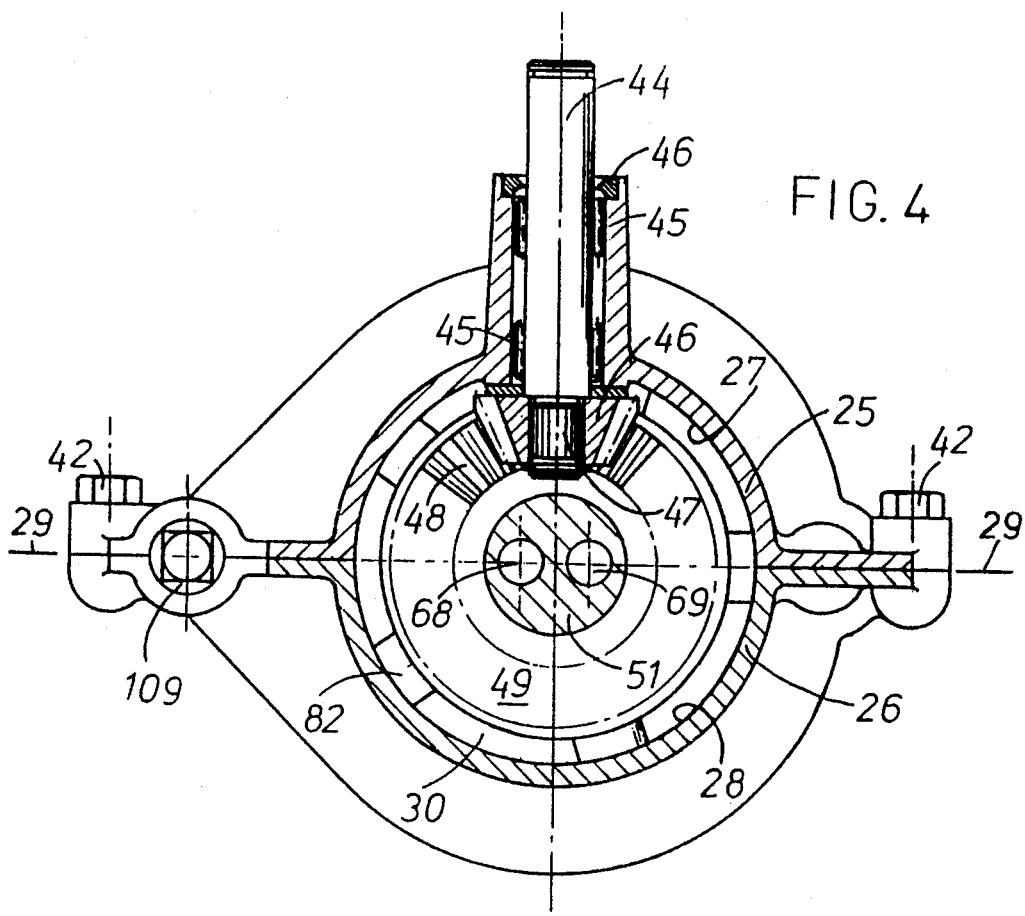
FIG. 4 is a part sectioned end view on line 4—4 of FIG. 3 of a vertical input shaft.
Figure 5:
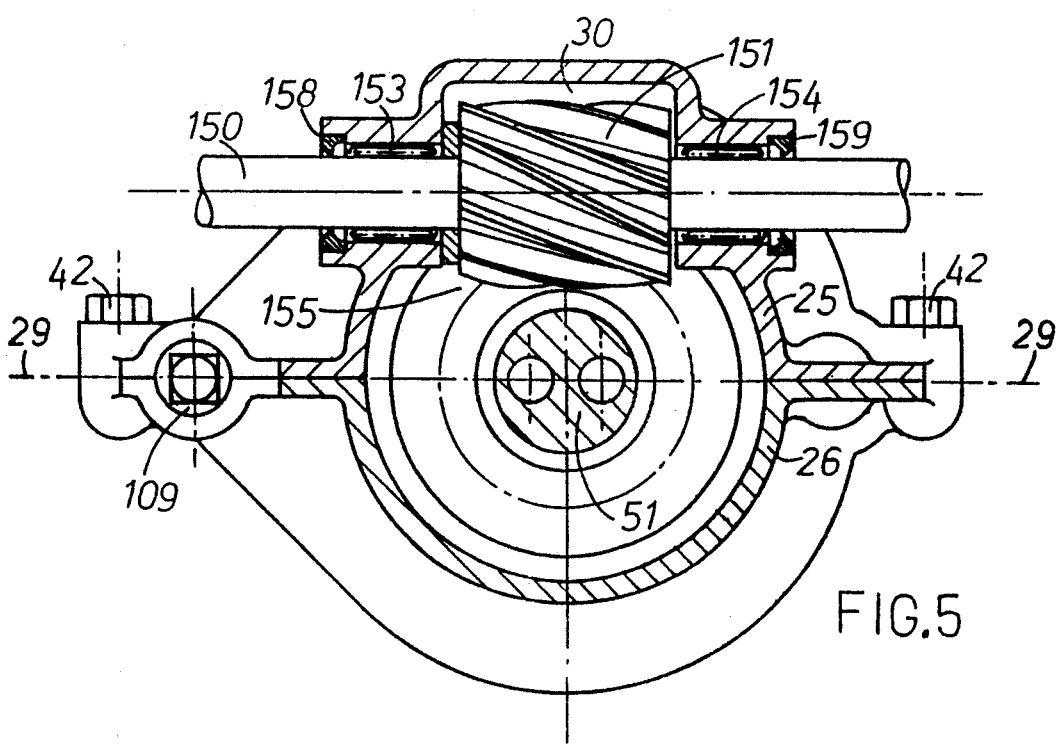
FIG. 5 shows the second embodiment of the invention and is a part sectioned end view on line 4—4 of FIG. 3 of a transaxle having a horizontal input shaft.

The transaxle 5 illustrated in FIGS. 3 to 5 comprises two housing elements 25, 26, each of which includes a number of pockets such as those pockets 27, 28 shown in FIG. 4. When the two housing elements 25, 26 are attached together along a parting plane 29, pockets combine to form internal chambers, chamber 30 containing a hydrostatic pump 20 fluidly coupled to two hydrostatic motors 21, 22, whereas each chamber 31, 32 contains a respective speed reducing means 33, 34. Housing elements 25, 26 form partition walls 300, 301 and where partition wall 300 separates chamber 30 from chamber 31, whereas partition wall 301 separates chamber 30 from chamber 32.

Chambers 30, 31, 32 need to be sealed against the loss of lubricant, and this is achieved by applying sealing means such as liquid gasket between the abutting surfaces of the two housing elements 25, 26. Shaft seals 35, 36 are provided for each respective axle shaft 37, 38, and preferably, further shaft seals 39, 40 are also provided to segregate hydraulic chamber 30 from chambers 31, 32. However, for some low-cost applications, shaft seals 39, 40 may be omitted allowing all chambers to be flooded in a common oil bath.

Preferably the two housing elements 25, 26 of the transaxle 5 are connected together along a parting plane 29, and attached together by a plurality of screws 42 which are inserted through holes 43. When screws 42 are tightened down, the housing elements 25, 26 form a stiff structure which can then be attached to the chassis 3 of the vehicle.

One of the housing elements is preferably formed to include an integral fluid expansion chamber (not shown) as described in U.S. Pat. No. 4,987,796 thereby allowing the contraction and expansion of the working fluid due to temperature fluctuation.

The transaxle 5 as illustrated has a vertical primary shaft 44 supported on bearings 45 and a fluid seal 46 is provided to prevent the escape of fluid from the hydraulic chamber 30. Primary shaft 44 protrudes through the upper housing element 25 to which is fitted a drive pulley 12 on which a vee belt 10 operates in transmitting power from the prime mover 1 to the transaxle 5 as shown in FIG. 1.

At the other end of the primary shaft 44 a first gear 46 is engaged at 47 for rotation with shaft 44. Gear 46 is arranged to mesh with a second gear 48 which is attached to cylinder barrel 49 of hydraulic pump 20 by means of drive dogs 50. Second gear 48 is supported on cylindrical member 51 by means of a bearing 52.

The use of such first and second gearing allows the axis of rotation to be turned through ninety degrees so that the rotating axis of the hydrostatic unit is parallel or coaxial with the drive wheel axes.

Second gear 48 driving cylinder barrel 49 of hydraulic pump 20 produces an axial thrust load which is effectively countered by the insertion of a thrust washer 54 disposed between cylinder barrel 49 and a wall 55 provided on one or both housing elements 25, 26 of the transaxle 5.

The pump 20 and motors 21, 22 of the hydrostatic unit are mounted back-to-back in coaxial configuration and are of generally similar construction with minor points of difference as described below.

The hydraulic pump 20 and motors 21, 22 each comprise a rotary cylinder barrel 49, 57, 58 mounted to rotate on cylindrical valve 51. Three pairs of arcuate ports are provided on the cylindrical valve 51, where the first pair of arcuate ports 61, 62 act as valve means for the hydraulic pump 20, and the remaining pairs of arcuate ports 63, 64, and 65, 66, act as valve means for each hydraulic motor 21, 22 respectively Cylindrical valve 51 is provided with at least two internal fluid galleries 68, 69, gallery 68 arranged to connect with arcuate ports 61, 63, 65, and gallery 69 arranged to connect with arcuate ports 62, 64, 66.

Cylindrical valve 51 is rigidly secured to the lower housing element 26 of the transaxle 5 by means of two saddle clamps 70, 71 or similar equivalent clamping means to fix the axial and radial location of the valve 51. The action of tightening two bolts 72 on each saddle clamp 70, 71 results in the cylindrical valve 51 being held fast to the lower housing member 26.

Preferably check valves 74, 75 are positioned in the end of the cylindrical valve 51 in order that additional fluid can be supplied into each fluid gallery 68, 69 respectively, within the cylindrical valve 51 to make up for fluid leakage losses that occur during operation, for example between the piston 82 and cylinder 80.

Cylinder barrel 49 of the hydraulic pump 20 comprises a plurality of cylinders 80 which are in fixed axial distance relative to their respective set of arcuate ports 61, 62 formed in cylindrical valve 51, and each cylinder 80 includes a duct 81 which is linked to arcuate ports 61, 62 during rotation of cylinder barrel 49.

Each cylinder 80 receives a piston 82 which is attached to a slipper shoe 83, and the cylinder barrel 49 rotates within a surrounding annular track ring 85.

Cylinder barrels 57, 58 of the respective hydraulic motors 21, 22 comprises each a plurality of cylinders 87, 88 which are in fixed axial distance relative to their respective set of arcuate ports 63, 64 and 65, 66 formed in cylindrical valve 51.

Each cylinder 87 of hydraulic motor 21 includes a duct 89 which is fluidly connected to arcuate ports 63, 64 during rotation of cylinder barrel 57. Furthermore, each cylinder 87 receives a piston 90 which is attached to a slipper shoe 91, and the cylinder barrel 57 rotates within a surrounding annular track ring 92.

Each cylinder 88 of hydraulic motor 22 includes a duct 93 which is fluidly connected to arcuate ports 65, 66 during rotation of cylinder barrel 58. Furthermore, each cylinder 88 receives a piston 94 which is attached to a slipper shoe 95, and the cylinder barrel 58 rotates within a surrounding annular track ring 96.

The slippers act against their respective track rings through the action of centrifugal force and may further be radially urged against the track ring by means of a discontinuous expander band as described in U.S. Pat. No. 4,635,535. Track rings 92, 95 of both hydraulic motors 21, 22 remain permanently set in eccentric relation to the cylindrical valve 51, and each track ring is located within a respective pockets 100, 101 formed in the housing elements 25, 26.

The role of the hydraulic pump 20 is to convert mechanical energy in the form of speed and torque provided by a prime mover 1 into fluid energy in the form of pressure and flow. The role of the hydraulic motors 21, 22 by contrast, is to reverse this process by converting the fluid energy back to mechanical energy.

In order that the speed of the vehicle can be changed without changing the rotating speed of the prime mover 1, it is necessary to alter both the rate and direction of fluid energy supplied by the hydraulic pump 20.

This is achieved by means of supporting track ring 85 on a pin 103 which acts as the pivot point for the track ring 85. The pin 103 extends through a hole 104 in the track ring 85 and is supported between the housing elements 25, 26. The pin 103 is fixed in position relative to cylindrical valve 51, and track ring 85 can move in a short arc centered on the pin 103.

Track ring 85 is further provided with a hole 106 generally diametrically opposite to the pivot pin 103, and into which a projecting pin 107 is inserted which engages with an adjusting arm 108 attached to a rocking spindle 109 operated externally, for example by a manual control lever. Spindle 109 is supported directly in the housing elements 25, 26 or by means of bearings if required. An oil seal 111 acts to prevent hydraulic fluid from seeping out from chamber.

Projecting pin 107 and adjusting arm 108 allow movement of spindle 109 to translate the rotary movement of an externally operated lever attached to spindle 109, into lateral swinging movement of the track ring 85.

Movement of the lever and spindle 109 causes the track ring 85 to swing through a small angle about the pivot pin 103 into an eccentric relationship with the rotating cylinder barrel 4 supported by the cylindrical valve 51. This causes pistons 82 to reciprocate radially outwards within their respective cylinders 80, and fluid is drawn from the low-pressure gallery 68 and arcuate port 61 and through duct 81 of the cylinder 80. As the piston 82 returns radially inwards into its cylinder 80, the fluid is expelled through the same duct 81 but into the opposite arcuate port 62 connecting to gallery 69 which leads to each hydraulic motor 21, 22.

Fluid from gallery 69 enters hydraulic motor 21 via arcuate port 63 and is directed into cylinder barrel 57 through duct 89 to cylinder 87. For hydraulic motor 22, the fluid passes via arcuate port 65 into cylinder barrel 58 through duct 93 to cylinder 88.

The pressurized fluid acting behind pistons 90 and 94 pushes the pistons 90, 94 out of their respective cylinders 87, 88 and by nature of angle that the pistons 90, 94 have to accommodate due to their respective eccentrically positioned track rings 92, 96, a side force is created on the cylinder wall which causes a turning moment on cylinder barrels 57, 58 which are then obliged to rotate.

Cylinder barrels 57, 58 is connected to their respective speed reducing means 33, 34 through a mis-alignment oldham coupling 115.

Each housing elements 25, 26 is further provided with a number of pockets 98, 99 as shown in FIG. 3, these pockets thereby forming internal chambers 31, 32 when the two housing elements are attached together. Into each respective chamber 31, 32, speed reducing means is located.

As an example, speed reducing means 33, 34 may comprise an eccentric member 120 which is formed on a hollow shaft 121 that is engaged through mis-alignment coupling 115 with each respective hydraulic motor 21, 22. Coupling 115 is provided with a spigot shaft 123 at one end on which a seal 124 and spline engaging means 125 are disposed, and where spline engaging means 125 connect with hollow shaft 121.

The hollow shaft 121 is journalled in the housing elements 25, 26 by bearing 130 and is further supported on bearings 131 which are located on axle shaft 37. Balance weight 126 attached to hollow shaft 121 is provided in order to balance the device.

A bearing 132 is disposed on eccentric 120 to support a pin carrier 133, and where rotation of the eccentric 120 causes the pin carrier 133 to gyrate. The pin carrier 133 is generally ring like in shape, and is provided with equally spaced openings 135, each opening 135 receiving and supporting a pin 137.

The pins 137 of the pin carrier 133 move into engagement sequentially with teeth 138 provided on the male gear means 140 during the gyratory motion of the pin carrier 133, the male gear means 140 being drivingly engaged to the axle shaft 37, 38.

In the embodiment shown, the pins 137 are only extended at one end through openings 135 in the pin carrier 133, and thereby are extended into apertures 142 provided in a coupling plate 143 that is attached to the interior chamber 31, 32 formed by the housing elements 25, 26 of the transaxle 5.

Rotation of the cylinder barrel 57, 58 of the hydraulic motors 21, 22, causes the hollow shaft 121 and eccentric 120 to rotate at like speed. The pin carrier 133, which is prevented from rotating by the engagement of the pin 137 extensions with the apertures 142 provided in the coupling plate 143, therefore gyrates about eccentric 120. This motion, combined with the difference between the number of pin openings 135 in the pin carrier 133 and the number of teeth 138 on the gear means 140, causes the gear means 140 to rotate at reduced speed as the pins 137 engage the teeth 138 in sequence. Through male gear means 140 and axle shafts 37, 38, rotation is transmitted to the wheels 6 of the vehicle. A fluid seal 35, 36 and bearing 148, 149 are positioned on each axle shaft 37, 38 to prevent lubricate loss from chambers 31, 32 and to provide support respectively.

Although this type of speed reducing means is to be preferred, in some applications it may be desirable to include other types of speed reducing means such as the well known epicyclic type.

A drive disengage may be incorporated in the transaxle in order that the vehicle can be pushed without operating the prime mover. This can be achieved by releasing a linkage which normally holds the coupling plate 143 of the speed reducing means 33, 34 static with the housing elements 25, 26. When the linkage is removed, rotation of the wheel 6 will turn the speed reducing means 33, 34 without turning the hydraulic motor 21, 22. However, as an alternative, a neutral shifting mechanism similar to that described in U.S. Pat. No. 5,042,252 may be used by moving track rings 92, 96 into concentric relationship with pintle valve 51.

DETAILED DESCRIPTION OF THE SECOND EMBODIMENT

FIG. 5 discloses an alternative input drive line for the transaxle which is suited for those applications where the prime mover of the vehicle is fitted with horizontal primary shaft.

In this case, the primary shaft 150 has a first gear 151 that is positioned within the hydrostatic chamber 30 formed by the housing elements 25, 26. The first gear 151 attached to the primary shaft 150 is preferably supported at each end in the housing elements 25, 26 by means of bearings 153, 154. First gear 151 engages with second gear 155 attached to the cylinder barrel 49 of the hydraulic pump 20 in a similar manner as already described for FIG. 4. However, in this case, primary shaft 150 is extended past the first gear 151 in order to pass out through the housing members 25, 26 in order that the primary shaft 150 may further engage with ancillary devices such as an auxiliary blower unit 19. Fluid seals 158, 159 are provided to prevent the loss of fluid from internal hydrostatic fluid chamber 30.

Parking of the vehicle may be achieved through the use of convention mechanical wheel brakes which can be engaged by the operator when the vehicle is at rest. Such braking means may also be used if skid-steering of the vehicle is required, by the action of braking one wheel so that is rotates at a slower speed than the other drive wheel.

However, skid-steering may also be provided by use of valves identical to the type described below in the second embodiment of the invention.

Only those features that are not common to the first embodiment shown as FIGS. 3 to 5 will be described in detail for the remaining embodiments. As such, those features which are substantially the same are designated by the same numerals as for the first embodiment.

DETAILED DESCRIPTION OF THE THIRD EMBODIMENT

Figure 6:
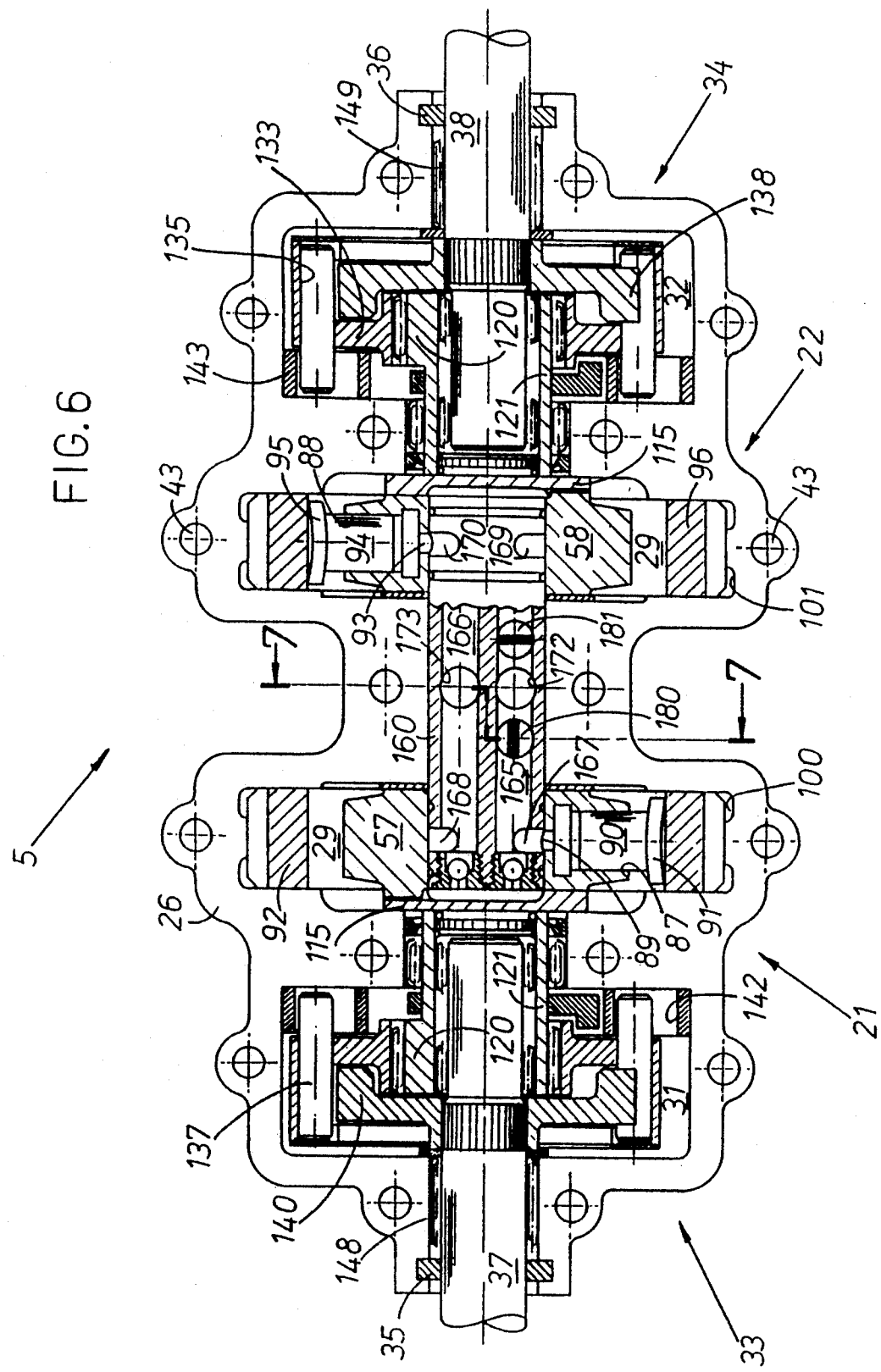
FIG. 6 shows the third embodiment of the invention and is a plan view of the transaxle, where one housing element is removed to show the internal components.
Figure 7:
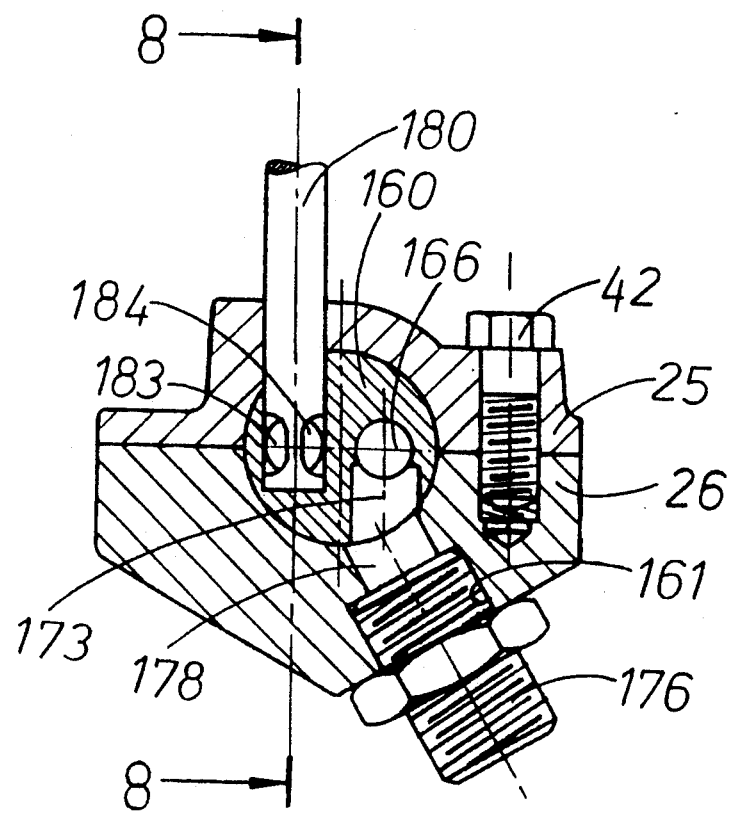
FIG. 7 a part sectioned side view on line 7—7 of FIG. 6 disclosing the skid-steer mechanism for the transaxle.
Figure 8:
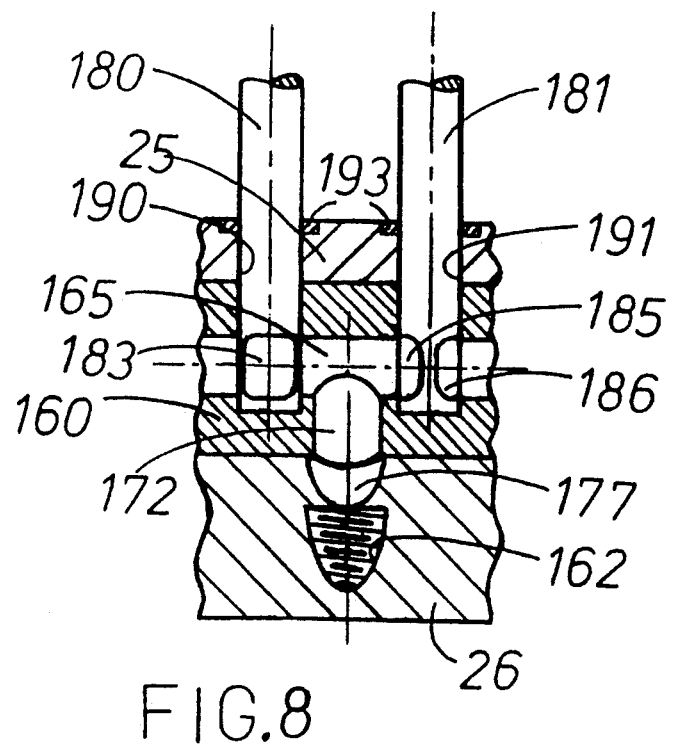
FIG. 8 is a part sectioned end view of the skid-steer mechanism on line 8—8 of FIG. 7.

In the second main embodiment of the invention as illustrated in FIGS. 6 to 8, the hydrostatic unit comprises only two hydraulic motors 21, 22. Therefore, in contrast with the first embodiment, no hydraulic pump is included.

The two hydrostatic hydraulic motors 21, 22 are fluidly coupled together on a cylindrical valve 160, and where hydraulic connections 161, 162 shown in FIGS. 7 and 8 are positioned on the transaxle housing element 26 and act as means for both supplying pressurized fluid from a remote source to feed the hydraulic motors 21, 22, and to return fluid to source.

Therefore, fluid energy is provided from a hydraulic pump which is mounted remote from the transaxle 5, and where fluid conduits link the fluid output of the pump to hydraulic connections 161, 162 provided on the exterior surface of housing element 26 of the transaxle 5. This arrangement is for instance, most useful for application in walk-behind grass mowers, allowing the pump to be driven by a prime mover located above the platform of the vehicle, whereas the transaxle may be located largely under the platform and therefore such fluid conduiting is most convenient in linking the pump to the hydraulic connections on the transaxle.

The invention can also be applied to larger equipment such as four-wheel drive tractors, allowing for transaxles to be fitted to both the front and rear axles. As a result, a remote pump located above the chassis 3 of the vehicle and driven by a prime mover 1, can have its fluid output directed through suitable valving to either or both the front and rear mounted transaxles 5.

A rear mounting transaxle comprises housing elements 25, 26 which are formed with a number of pockets 101, 102, 98, 99 into which the hydraulic motors 20, 21 and speed reducing means 33, 34 are respectively located. When the two housing elements 25, 26 are attached together, these pockets form chambers, where chamber 29 contains hydraulic motors 21, 22, and chambers 31, 32 contain speed reducer means 33, 34 respectively.

The hydrostatic motors of the transaxle are mounted in back-to-back coaxial configuration to each other, with the their rotating axis parallel to the half shafts 3, 38 of the transaxle 5. Both hydrostatic motors 21, 22 are identical in construction, and each comprises a rotary cylinder barrel 57, 58 rotatably mounted at each end of a common cylindrical valve 160.

The cylindrical valve 160 is provided with at least two internal galleries 165, 166 located within its outer walls, and two sets of arcuate shaped ports 167, 168 and 169, 170 connect with respective galleries 165, 166 to allow fluid communication with the motors 21, 22.

About its mid point, the cylindrical valve 160 is provided with two radial holes 172, 173 which intersect the axes of the galleries 16, 167, where radial hole 172 connects with gallery 65 and where radial hole 173 connects with gallery 166.

Housing element 26 is provided with two threaded fluid connections 161, 162, a hydraulic fitting 176 being attached to each fluid connection. Each fluid connection 161, 162 leads by way its corresponding duct 177, 178 to its respective radial hole 172, 173 and gallery 165, 166 in the cylindrical valve 160. As a result, incoming fluid from a remote mounted pump is introduced to the transaxle at say, connection 161, and flows through duct 178, radial hole 173 and into gallery 166 in the cylindrical valve 160. The fluid feeds to each hydraulic motor 21, 22 by passing out of respective arcuate ports 168, 170 and through ducts 89, 93 into the cylinders 87, 88 where it acts behind pistons 90, 94 to cause rotation of the respective cylinder barrels 57, 58 in a way as has already be described in detail for the first embodiment.

The return oil under lower pressure from each hydraulic motor 21, 22 is expelled from their respective cylinder 87, 88 and duct 89, 93 into arcuate ports 167, 169 to gallery 165. From here the fluid is directed through radial hole 172, duct 177, hydraulic connection 162 and returned to the hydraulic pump.

The operation of this transaxle and for that matter, the transaxle described and illustrated as the first embodiment, can be greatly improved by the addition of a simple skid-steer device.

The skid-steer device here disclosed comprises two manually rotatable shafts 180, 181, each respective shaft 180, 181 is provided with a pair of slots 183, 184 and 185, 186 or alternatively a hole.

Housing 25 and cylindrical valve 160 are each provided with a pair of holes 190, 191 allowing entry of shafts 180, 181.

Shafts 180, 181 are inserted in cylindrical valve 160 such a way that slots 183, 184, 185, 186 are positioned within fluid gallery 165 on either side of the centrally located radial hole 172. It is preferable to fit the shafts 180, 181 to the lower pressure gallery 165 in the cylindrical valve 160 in order to minimise fluid leakage past the shafts. As a result, gallery 165 is only subjected to high pressure for the occasion and short duration when the vehicle is reversed. Fluid seals 193 are fitted to prevent fluid leaking out from holes 190, 191.

When positive pressure is applied thorough hydraulic connection 161 to gallery 166 for forward motion of the vehicle, it will be seen in FIGS. 6 and 8 that the opposite gallery 165 in which the shafts 180, 181 are located, have slots 183, 184 on shaft 180 aligned parallel to the longitudinal axis of gallery 165, and that therefore, there is no obstruction for the return fluid from hydraulic motor 21 from reaching radial exist hole 172.

However, for hydraulic motor 22, slots 185, 186 of shaft 181 are shown in perpendicular alignment to the longitudinal axis of gallery 165. As a result, return fluid from motor 22 is restricted or, depending on the clearance between the slots 185, 186 in gallery 165, prevented by the slots 185, 186 closing off gallery 165 from passing out from gallery 165 to radial exit hole 172.

As a result, hydraulic motor 22 is stopped although in practice it is not necessary for the slots 185, 186 to completely shut return gallery 165, as a small but not total restriction will be sufficient to cause hydraulic motor 22 to rotate at slower speed than the opposite hydraulic motor 21, with the effect that the vehicle is steered to the right by the differential action between the wheels 6.

Obviously, if the operator turns shafts 180, 181 in the opposite way, it will be hydraulic motor 21 which is slowed down, whereas hydraulic motor 22 will increase in rotative speed, and as a result, the vehicle will turn to the left.

When the operator positions both shafts 180, 181 such that their respective slots 183, 184 and 185, 186 are parallel to the longitudinal axis of gallery 165, then no restriction for either motor occurs, and the vehicle moves in a straight line.

When the operator positions both shafts 180, 181 such that their respective slots 183, 184 and 185, 186 are at right-angle to the longitudinal axis of gallery 165, then gallery 165 is restricted for both motors and this ma be useful when the vehicle is parked while the engine is still running.

The skid-steer device may with modification be used for providing the vehicle with a hydraulic dump in order that the vehicle can be pushed without engaging the prime mover. This can be done by allowing galleries 165 and 166 to connect together by including a linking passage that is operable when either or both shafts 180, 181 is lifted, thereby exposing the passage to both galleries 165, 166. Alternatively for instance, shaft 180 when lifted to the point where the slots 183, 184 are protruding from the cylindrical valve 160, could be arranged to bleed fluid from gallery 165 to chamber 29 to obtain the same desired characteristic.

DETAILED DESCRIPTION OF THE FOURTH EMBODIMENT

For certain vehicle applications, it may not be necessary that the half-shafts should remain coaxial with the rotating axis of the hydrostatic machine.

As a result, the embodiment illustrated as FIG. 9 discloses the use of two spur gear sets, each gear set mechanically connecting a hydrostatic motor to its respective axle shaft of the transaxle.

As the main aspects of the hydrostatic machine is the same as for the first embodiment using the first and second gears of FIG. 5, only those features not common are described below in detail. Those features which are substantially the same are designated by the same numerals as in the first embodiment.

As for the earlier two embodiments, the housing structure of FIG. 9 comprises two main elements that incorporate a number of pockets which form one or more internal chambers once the two housing elements are connected together. For purposes of illustration, one housing element has been removed in order to clearly shown the internal components.

Therefore, transaxle 5 includes hydrostatic pump 20 and two hydrostatic motors 21, 22 that are located within pocket 200 in housing element 201, whereas pockets 203, 204 contain gearing 206, 207 respectively.

As mechanical gear train 206 connecting hydraulic motor 22 to axle shaft 208 is identical to gear train 207 connecting hydraulic motor 21 to axle shaft 209, only gear train 206 relating to the right hand hydraulic motor 22 will be now described.

Cylinder barrel 58 of hydraulic motor 22 is connected with the brakeshaft 214 by a misalignment coupling 212 such as an oldham, and where the oldham coupling 212 is fixed to the brakeshaft 214 by means of spines 215.

Brakeshaft 214 is rotatably supported in the housing by means of two bearings 217, 218, and where the end of the brakeshaft 214 protrudes out from the housing to engage a disc 220 that forms one element of a conventional brake such as the caliper type well known in the art.

Brakeshaft 214 is provided with a further set of splines 222 on to which is fixed gear pinion 223, and where the teeth 224 on pinion 223 mesh with one set of teeth 226 provided on first cluster gear 227. First cluster gear 227 is supported for rotation on axle shaft 208 by means of bearing 230.

A second set of teeth 232 on first cluster gear 227 mesh with a first set of teeth 234 on second cluster gear 236 which is supported for rotation on the brakeshaft 214 by means of bearing 237.

A second set of teeth 240 are provided on second cluster gear 236 which mesh with teeth 242 of final gear 243 which is fixedly splined 245 to axle shaft 208, and where axle shaft 208 is rotatably supported in the housing by bearings 247, 248.

Thereby, rotation of cylinder barrel 58 of hydraulic motor 22 is transmitted by gearing 206 to axle shaft 208.

Seals 260, 261 are provided on brakeshaft 214 and axle shaft 208 respectively, in order to prevent gear lubricate contained within pocket 203 from escaping to the environment The type of reduction gearing described above can also be applied to to a transaxle of the type shown and described as embodiment three.

The fourth embodiment also shows the use of an extra pair of check valves 270, 271 located in fluid galleries 68, 69 respectively, at the right hand end of pintle valve 51. This feature can also be incorporated in either of the two earlier embodiments and provides an enhanced fluid make-up capability when particularly, the skid-steering is applied.

It is to be understood that while we have illustrated and described three main embodiments of our invention, it is not to be limited to any one specific form or arrangement of parts herein described and shown except insofar as such limitations are included in the claims.

What is claimed is:

1. An axle assembly comprising:
a housing including two main housing elements connected together along a parting plane to define an internal chamber;
a hydrostatic transmission encapsulated in said chamber and including a hydrostatic pump fluidly coupled to a pair of hydrostatic motors by means of a fluid coupling member non-rotatably supported in said housing,
said fluid coupling member providing cylindrical surfaces to rotatably support said hydrostatic pump and said pair of hydrostatic motors;
a primary shaft rotatably mounted in said housing and extending into said chamber to carry a first gear;
a second gear rotatably supported on said fluid coupling member and drivingly engaged to said first gear, said second gear drivingly connected to said hydrostatic pump;
axle shaft rotatably supported in said housing on an axis substantially coincident with said parting plane;

and each one of said pair of hydrostatic motors being connected by speed reducing means to a respective one of said axle shafts.

2. An axle assembly of claim 1 wherein said second gear is disposed between said hydrostatic pump and one of said pair of hydrostatic motors.

3. An axle assembly of claim 2 wherein the axis of rotation of said primary shaft is displaced through ninety degrees of the operation of said first and second gears.

4. An axle assembly of claim 1 wherein at least two hydraulic fluid passages terminating in ports are provided within said fluid coupling member to fluidly link said hydrostatic pump with said pair of hydrostatic motors.

5. An axle assembly of claim 1 wherein said fluid coupling member is fixed and non-rotatably mounted to at least one said housing elements by clamping means.

6. An axle of claim 5 wherein said clamping means comprises a pair of saddle clamps, each said saddle clamp being positioned between said hydrostatic pump and one of said pair of hydrostatic motors.

7. An axle assembly of claim 1 wherein said fluid coupling member is provided with at least two hydraulic fluid passages connecting with three pairs of arcuate shaped ports.

8. An axle assembly of claim 1 wherein said fluid coupling member is disposed in coaxial relationship with said axle shafts.

9. An axle assembly of claim 1 wherein two or more support shafts are provided within said housing to carry working elements of said speed reducing means.

10. An axle assembly of claim 4 wherein means for producing flow restriction is included within at least one of said hydraulic fluid passages, the operation of which acts to bias a larger proportion of fluid to either one of said pair of hydrostatic motors.

11. An axle assembly of claim 4 wherein a check valve is located in each of said hydraulic fluid passages.

12. An axle assembly of claim 4 wherein said hydrostatic pump and said pair of hydrostatic motors each include a rotary cylinder barrel comprising a plurality of radially arranged cylinders and a plurality of pistons disposed in said cylinders, said cylinders successively communicating with said ports during rotation of said cylinder barrel, each said rotary cylinder barrel rotatably mounted on said fluid coupling member.

13. An axle assembly according to claim 12 wherein an annular track ring surrounds each said cylinder barrel, said pistons operatively connected to said track ring.

14. An axle assembly according to claim 1 wherein said primary shaft is arranged to pass through said housing for coupling to ancillary devices.

15. An axle assembly comprising:
 a housing including two main housing elements connected together along a parting plane and defining first, second and third internal chambers;
 a hydrostatic transmission encapsulated in said first chamber and including a hydrostatic pump fluidly coupled to a pair of hydrostatic motors by means of a fluid coupling member non-rotatably supported in said housing,
 said fluid coupling means providing cylindrical surfaces to rotatably support said hydrostatic pump and said pair of hydrostatic motors;
 a primary shaft rotatably mounted in said housing and extending into said first chamber to carry a first gear;
 a second gear rotatably supported on said fluid coupling member and drivingly engaged to said first gear, said second gear drivingly connected to said hydrostatic pump;
 speed reducing means contained within said second and third internal chambers;
 axle shafts rotatably supported in said housing on an axis substantially coincident with said parting plane;
 and wherein each one of said pair of hydrostatic motors is connected to said speed reducing means to a respective one of said axle shaft.

16. An axle assembly of claim 15 wherein said housing in provided with partitioning walls to separate said second and third chambers from said first chamber.

* * * * *